Nov. 3, 1936.    F. CAVUOTI    2,059,932
RECEPTACLE CLOSURE
Filed April 17, 1935
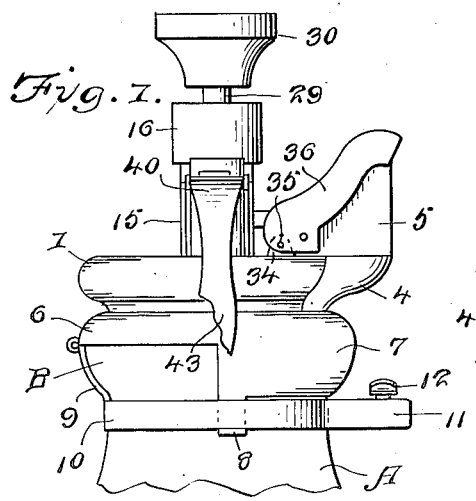
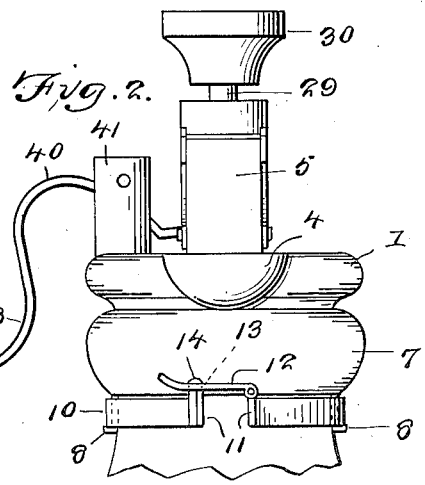
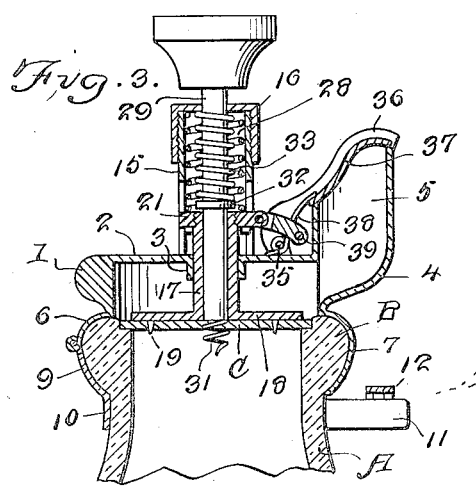
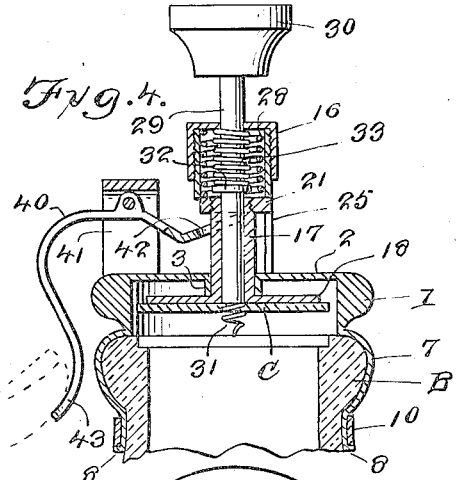
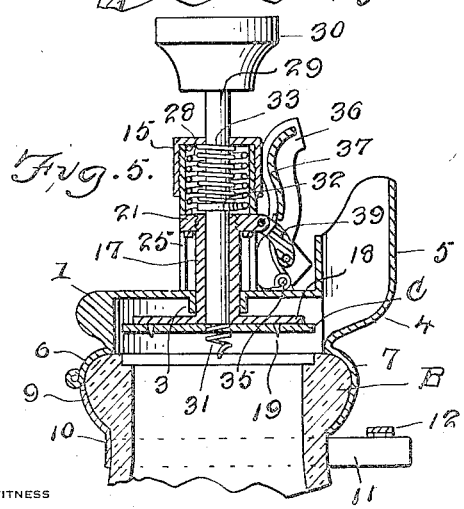
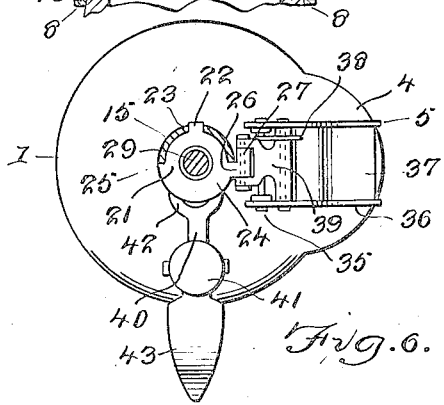
Frank Cavuoti
INVENTOR
BY Victor J. Evans & Co.
ATTORNEY Patented Nov. 3, 1936

2,059,932

UNITED STATES PATENT OFFICE 2,059,932

RECEPTACLE CLOSURE

Frank Cavuoti, Ozone Park, N. Y.

Application April 17, 1935, Serial No. 16,916

3 Claims. (Cl. 215—71)

This invention relates to receptacle closures, and its general object is to provide a closure or cover that is primarily designed for use with a milk bottle for the purpose of retaining its contents and the lip of the bottle free from dirt, dust and foreign matter, and therefore in a clean and sanitary condition, during the use of the contents, in that while the contents can be poured therefrom at intervals it is exposed to the air only at the time it is being poured, and the original cap is not removed prior to applying my closure which includes means for removing and replacing the cap at the pouring intervals, with the result it will be seen that it is practically impossible for the contents to become contaminated.

A further object of the invention is to provide a closure for a milk bottle, that includes a pouring spout with a cover therefor which is normally held closed and automatically moved to closed position.

Another object of the invention is to provide a closure for milk bottles that includes means for clamping the same to the bead of the bottle and about the lip thereof, in a manner to prevent casual removal or displacement.

A still further object of the invention is to provide a milk bottle closure that is simple in construction, inexpensive to manufacture, easy to apply and extremely efficient in use, operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a side view illustrating my closure secured to a milk bottle.

Figure 2 is a front view thereof.

Figure 3 is a vertical sectional view taken through the closure and the pouring spout thereof.

Figure 4 is a vertical sectional view taken at right angles to Figure 3.

Figure 5 is a vertical sectional view similar to Figure 3 with the cover of the pouring spout in open position.

Figure 6 is a vertical sectional view taken through the closure with parts in elevation and showing the cover of the pouring spout in closed position.

Referring to the drawing in detail, it will be noted that I have illustrated my closure applied to a milk bottle, but I want it understood that it can be used with other receptacles without departing from the spirit of the invention.

For distinction the bottle is indicated by the letter A, B the bead which provides the lip thereof, and C the usual disk cap received in the groove of the bottle.

My closure includes a body 1 that includes a top 2 which is flat as shown, and is provided with a central opening having a collar 3 depending therefrom to act as a bearing for a purpose which will be later described. The body is shown as being substantially circular in formation and the sides are rounded and outwardly bulged for a portion of the circumference of the body, while the remaining portion has formed thereon an enlargement 4 which together with the top 2 has rising therefrom a pouring spout 5, the latter being directed upwardly as best shown in Figure 5.

Depending from the body and formed thereon is an annular member 6 which is outwardly bulged in rounded formation to fit and contact the bead B of the bottle. The member 6 elevates the body 1 above the bead, in that the upper edge of the member 6 rests upon the upper edge of the bead as clearly shown in Figure 5. Formed on the annular member and depending therefrom is a semi-circular bead engaging member 7 and the member 7 has extending downwardly from the opposite end thereof tongues 8 that contact the bottle A below the bead, as best shown in Figure 4.

Hingedly secured to the annular member 6, through the instrumentality of a strip 9 that likewise follows the shape of the bead, is a resilient ring member 10 having ears 11 formed on and extending outwardly from the ends thereof. One of these ears has pivotally secured thereto a handle 12 that is provided with an opening 13, while the opposite ear has secured thereto and rising therefrom a headed stud 14 for disposal in the path of the opening to be received therein as shown in Figure 2, with the ring member disposed about the neck of the bottle and the tongues 8, for securing the closure in operative position on the bottle.

Secured to and rising from the top 2 is a cylindrical housing 15 that is provided with an exteriorly threaded upper end to receive a cap member 16. Mounted for slidable movement in the housing 15 is a sleeve 17 which extends through the opening in the top 2 to be received in the collar 3 which acts as a bearing therefor, and the sleeve 17 has formed on its lower end a disk 18 that is provided with penetrating prongs 19 to pierce the cap C, as clearly shown in Figures 3 and 5.

The upper end of the sleeve 17 is interiorly threaded to receive a cross head 21 which is provided with a lug 22 laterally extending therefrom for slidable movement in a vertical slot 23 in the housing 15. The cross head is provided with an enlarged portion 24 providing a shoulder to contact one vertical edge of a recess 25 in the housing 15, and extending from the cross head diametrically opposite the shoulder is a lug 26 having a lateral portion 27 formed thereon.

Arranged in the housing 15 and having its end convolutions engaging the cap member 16 and the cross head is a coil spring 28 for urging the cross head downwardly, and mounted for slidable movement through the cap member and sleeve is a plunger rod 29 which has a knob 30 secured to its upper end to act as a handle therefor, while a spiral piercing element 31 extends from the lower end thereof, as clearly shown in Figure 5, for a purpose which will be presently described. Surrounding the plunger rod and disposed between the cap member 16 and collar 32 on the rod is a coil spring 33 that urges the plunger rod downwardy through the sleeve, and the coil spring 33 is disposed within the coil spring 28.

Secured to and rising from the top 2 are spaced parallel apertured ears 34 which have pivotally secured thereto through the instrumentality of a pin 35 a cover 36 for the pouring spout 5, the latter having a rounded inclined upper edge with its lower portion innermost and the top 37 of the cover 36 is shaped to fit the upper edge of the spout, as clearly shown in Figure 3. The spout is normally held closed through the instrumentality of a resilient finger 38 that has one of its ends contacting the top 37 and its opposite end portion is wrapped around the pivot pin 35.

A link member 39 has one end pivotally secured to the cover 36 and its opposite end is bifurcated and pivotally connected to the lug 26, as clearly shown in Figure 6, for the purpose of disposing the cover 36 in open position upon upward movement of the cross head which is actuated accordingly through the instrumentality of a handle 40.

Formed on and rising from the top 2 is a bracket 41 of substantially U-shape configuration, and the handle 40 is pivoted intermediate its ends to the arms of the bracket 41. The inner end of the handle 40 is bifurcated as at 42, with the portions thereof disposed upon the opposite sides of the sleeve 17 and contacting the bottom of the cross head whereas upon downward movement of the handle 40 the cross head will be raised and carries the sleeve 17 accordingly, so that the disk 18 and plunger rod 29 will likewise be raised, and the cover will be disposed to open position.

It will be noted that the handle is provided with a downwardly and outwardly curved free portion which for distinction is indicated by the reference numeral 43, in order to provide a convenient finger contacting terminal as best shown in Figure 4.

In the use of my closure, it is applied to the neck of the bottle as clearly shown in the drawing, and prior to removing the disk cap C. The plunger rod is rotated for disposing the piercing element 31 through the disk cap C, and such action causes the penetrating prongs 19 to pass through that cap. When it is desired to pour some or all of the contents from the bottle A, the handle 40 is depressed as shown in Figure 4, and that action will simultaneously lift the disk cap C and move the cover 36 to the open position as shown in Figure 5. When the handle is released, the disk cap C will be replaced in the groove of the bottle and the cover will be automatically closed.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A closure for a milk bottle comprising a hollow body, means formed on the body and encircling the bead of the bottle, clamping means secured to the encircling means for detachably securing the closure to the bottle, a pouring spout secured to the body, a cover for the pouring spout, means for connection with the cap of the bottle for raising and lowering the same, means for opening the cover means of connection between the cap raising and lowering means and the cover opening means for simultaneously opening the cover when the cap is raised, manual means for operating the cover opening means, and means for automatically closing the cover when the cap is lowered to closed position.

2. A closure for a milk bottle comprising a hollow body, means formed on the body and depending therefrom for encircling the bead of the bottle and to elevate the body above the bead, clamping means pivotally secured to the encircling means for detachably securing the closure to the bottle, a pouring spout rising from and communicating with the body, a cover for the pouring spout, means for opening the cover spring pressed means slidably mounted through the body and including means for connection with the cap of the bottle for raising and lowering the same, means of connection between the cap raising and lowering means and the cover opening means for simultaneously opening the cover when the cap is raised, manual means for operating the cover opening means, and means for automatically closing the cover when the cap is lowered to closed position.

3. A closure for a milk bottle, comprising means for enclosing the outlet thereof, a pouring spout included in the enclosing means, a cover for the pouring spout, a spring pressed plunger mounted for slidable movement through the enclosing means, and including means for connection with the cap of the bottle for securing the latter to the plunger for raising and lowering the same, means of connection between the plunger and the cover for simultaneously opening the cover when the cap is raised, a handle for operating the last mentioned means, and means for automatically closing the cover when the cap is lowered to closed position.

FRANK CAVUOTI.